(12) United States Patent
Ohmi et al.

(10) Patent No.: US 6,408,879 B1
(45) Date of Patent: *Jun. 25, 2002

(54) FLUID CONTROL DEVICE

(75) Inventors: Tadahiro Ohmi, Sendai; Yukio Minami, Osaka; Akihiro Morimoto, Osaka; Nobukazu Ikeda, Osaka; Keiji Hirao, Osaka; Takashi Hirose, Osaka; Michio Yamaji, Osaka; Kazuhiro Yoshikawa, Osaka, all of (JP)

(73) Assignees: Tadahiro Ohmi, Miyagi; Fujikin Incorporated, Osaka, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,817

(22) Filed: Aug. 3, 1998

(30) Foreign Application Priority Data

Aug. 5, 1997 (JP) .............................................. 9-210254

(51) Int. Cl.$^7$ .............................................. F16K 11/00
(52) U.S. Cl. ...................................................... 137/606
(58) Field of Search .................................. 137/606, 557

(56) References Cited

U.S. PATENT DOCUMENTS

| | | | | |
|---|---|---|---|---|
| 462,966 A | * | 11/1891 | Dodd ....................... | 137/606 X |
| 643,117 A | * | 2/1900 | Fromberger ............. | 137/557 X |
| 1,525,393 A | * | 2/1925 | Jernatowski ............. | 137/606 |
| 3,797,524 A | | 3/1974 | Sanelli ..................... | 137/606 |
| 4,168,724 A | | 9/1979 | Graffunder et al. ....... | 137/606 |
| 4,558,845 A | | 12/1985 | Hunkapiller ............. | 137/606 X |
| 4,741,354 A | | 5/1988 | DeMild ..................... | 137/240 |
| 4,768,543 A | | 9/1988 | Wienke et al. ............ | 137/606 X |
| 4,903,722 A | | 2/1990 | Joseph et al. ............. | 137/209 |
| 5,137,047 A | | 8/1992 | George ..................... | 137/240 |
| 5,183,072 A | | 2/1993 | Pengler .................... | 137/113 |
| 5,368,062 A | | 11/1994 | Okumura et al. .......... | 137/240 |
| 5,476,118 A | | 12/1995 | Yokoyama ................ | 137/599 |

FOREIGN PATENT DOCUMENTS

| | | |
|---|---|---|
| EP | 0 429 411 A2 | 5/1991 |
| EP | 0 619 450 A1 | 10/1994 |
| EP | 0 751 301 A2 | 1/1997 |
| EP | 0 806 573 A2 | 11/1997 |
| EP | 0 816 731 A2 | 1/1998 |
| EP | 0 288 931 | 11/1999 |
| WO | WO 98/02684 | 1/1998 |

OTHER PUBLICATIONS

European Search Report, 4 pgs.

Patent Abstracts of Japan; vol. 96, No. 5, May 31, 1996 & JP 08 005000 A (Fujikin:KK), Jan. 12, 1996.

Patent Abstracts of Japan; vol. 12, No. 286 (M–727), Aug. 5, 1988 & JP 63 062976 A (Daiwa Handotai Sochi KK), Mar. 19, 1988.

\* cited by examiner

*Primary Examiner*—Robert M. Fetsuga
(74) *Attorney, Agent, or Firm*—Armstrong Westerman & Hattori, LLP

(57) ABSTRACT

A fluid control device comprises a first passageway, and a second passageway communicating therewith and having a terminating end closed with a fluid control unit or instrument. The first passageway is adapted to pass a fluid therethrough with a different fluid remaining in the second passageway. The first passageway comprises an upstream portion and a downstream portion communicating with the upstream portion at an approximate right angle therewith. The second passageway extends from a terminating end of the upstream portion of the first passageway in alignment with the upstream portion.

1 Claim, 4 Drawing Sheets

FLUID CONTROL DEVICE

BACKGROUND OF THE INVENTION

The present invention relates to fluid control devices which are adapted, for example, for use in apparatus for manufacturing semiconductors and which require passage of a first fluid therethrough and subsequent replacement of this fluid by a second fluid.

Fluid control devices comprise various components, such as filters, pressure regulators, various kinds of valves, massflow controllers, pressure gauges and pressure sensors, which are connected together. For example as shown in FIG. 5, a pressure gauge 40 is provided generally at the terminating end of a branch channel 42 extending from a main passageway 41 at right angles therewith.

With this conventional fluid control device, the branch channel having its terminating end closed with the pressure gauge provides a so-called dead volume, and with a fluid remaining in this portion of dead volume, another fluid is subsequently passed through the passageway. It is an important problem to reduce the replacement time involved in this procedure and taken for the purity of the subsequent fluid to reach a required value. Consideration is therefore given to how to diminish the dead volume. However, no consideration whatever has been given to the relation between the main passageway and the branch channel relative to each other.

SUMMARY OF THE INVENTION

An object of the present invention is to provide a fluid control device wherein consideration is given to the position of passageways relative to each other so that one fluid can be replaced by another within a shortened period of time.

The present invention provides a fluid control device comprising a first passageway, and a second passageway communicating therewith and having a terminating end closed with fluid control means, the first passageway being adapted to pass a fluid therethrough with a different fluid remaining in the second passageway, the fluid control device being characterized in that the first passageway comprises an upstream portion and a downstream portion communicating with the upstream portion at an approximate right angle therewith, the second passageway extending from a terminating end of the upstream portion of the first passageway in alignment with the upstream portion.

Useful fluid control means include a measuring instrument, such as a pressure gauge or pressure sensor, closing the terminating end of the second passageway at all times, and a channel opening-closing device, such as is provided by a valve, for temporarily closing the terminating end of the second passageway.

The fluid control device of the present invention has the feature that the second passageway providing a dead volume in replacing one fluid by another extends from the terminating end of the upstream portion of the first passageway in alignment with the upstream portion, whereby the time required for the replacement of fluid can be shortened without diminishing the dead volume.

DESCRIPTION OF THE PREFERRED EMBODIMENTS

Figure 1:
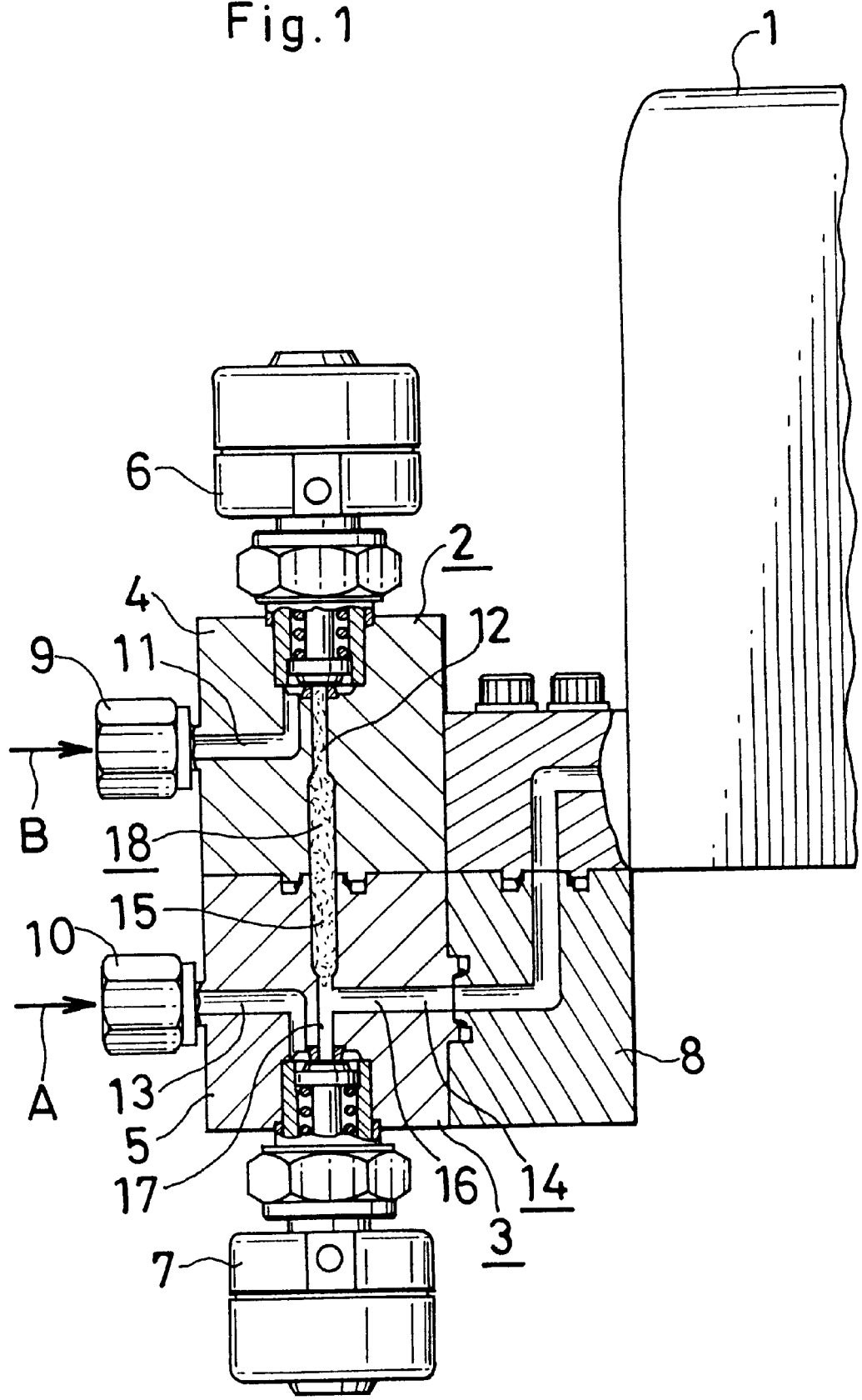
FIG. 1 is a view in vertical section showing a fluid control device embodying the invention.

FIG. 1 shows a fluid control device embodying the invention. The device includes two integrally related on-off valves 2, 3 vertically opposed to each other and arranged at the inlet side of a massflow controller 1. Although not shown, the outlet side of the controller is also provided with two on-off valves vertically opposed to each other. The upper on-off valve 2, identified herein as the second valve, and the lower on-off valve 3, identified as the first valve, have their bodies 4, 5 joined to each other. The upper, or second, valve 2 has an actuator 6 mounted on the top side of the valve body 4, while the lower, or first, valve 3 has an actuator 7 attached to the bottom side of the valve body 5. The body 5 of the lower valve 3 is joined to a channel block 8 provided at the inlet side of the massflow controller 1. The upper and lower valve bodies 4, 5 are provided with respective inlet pipe connecting couplings 9, 10 the latter connecting with a source of the first fluid, indicated as A, and the former connecting with a source of the second fluid, indicated as B. The upper valve body 4 is formed with an L-shaped inflow channel 11, and an I-shaped outflow channel 12. The outflow channel 12 is open downward. The lower valve body 5 is formed with an inverted L-shaped inflow channel 13 symmetric with the L-shaped inflow channel 11 of the upper valve body 4, an inverted L-shaped outflow channel 14 generally symmetric with this inflow channel 11, and a bypass channel 15 that penetrates the upper end of the lower valve body 5 thereby holding the outflow channel 14 in communication with the outflow channel 12 that penetrates the lower end of the upper valve body 4. The inverted L-shaped outflow channel 14 of the lower valve body 5 comprises a main passageway (downstream portion) 16 communicating with the massflow controller 1, and a first fluid sub-passageway (upstream portion) 17 that is axially aligned with the by-pass channel 15 and communicating therewith and with the main passageway 16 at an approximate right angle thereto. The main passageway 16 is used not only for the outflow of a fluid flowing in through the lower inlet pipe coupling 10 but also for the outflow of a fluid flowing in through the upper inlet pipe coupling 9. The combination of the outflow channel 12 of the upper valve body 4 and the bypass channel 15 of the lower valve body 5 provides a second fluid sub-passageway 18 terminating at one end with the valve actuator 6 of valve 2 and at the other end with the first fluid passageway of valve 3.

Figure 2:
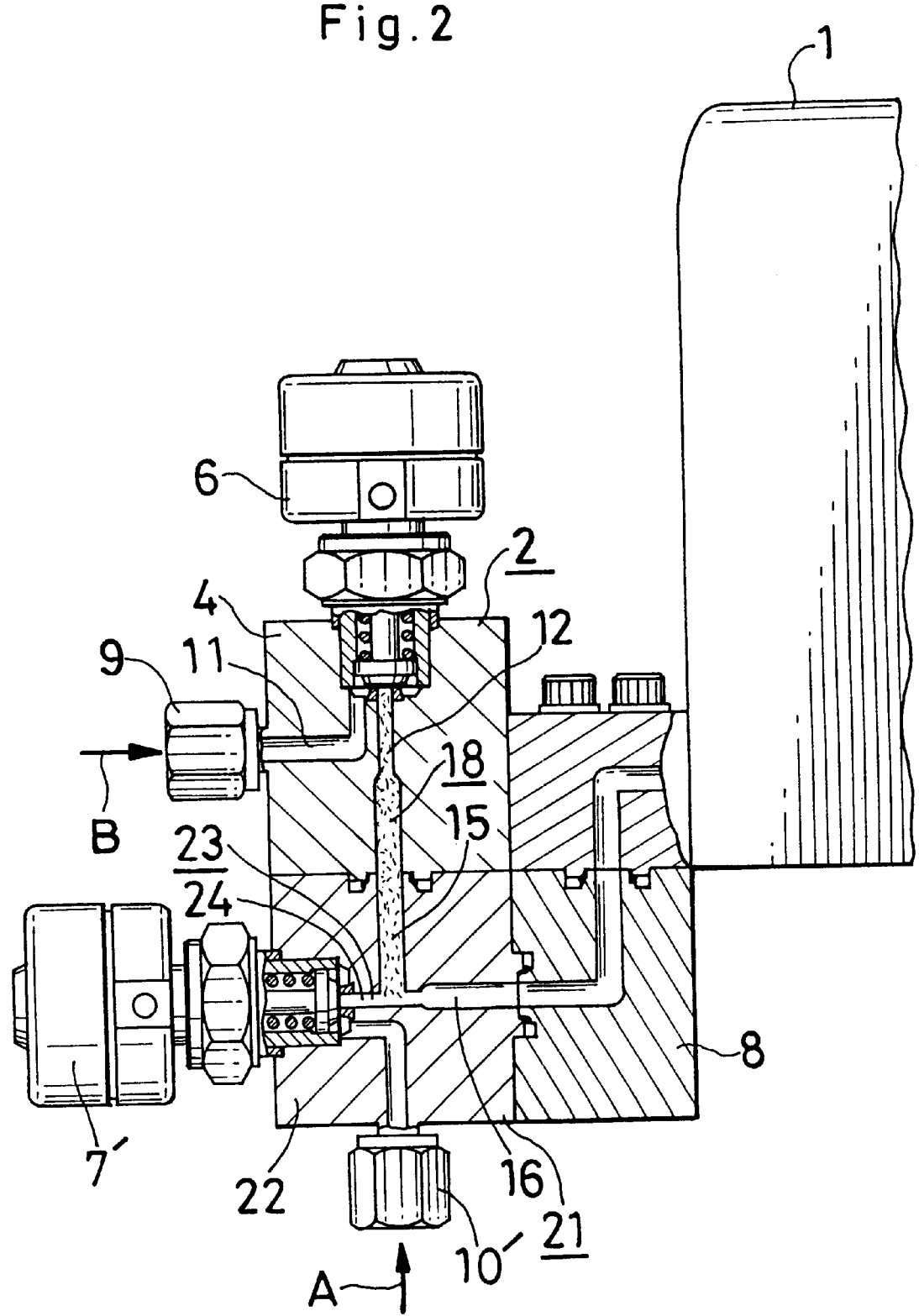
FIG. 2 is a view in vertical section showing a fluid control device for comparison.

FIG. 2 shows a fluid control device used for comparison with the fluid control device shown in FIG. 1. The body 22 of a lower on-off valve 21 has a fluid passage different from the corresponding passage of FIG. 1. More specifically stated, the valve body 22 has an inlet pipe connecting coupling 10' attached to the bottom side thereof and an actuator 7' mounted on the left side thereof. An outflow channel 23 is I-shaped and comprises a main passageway (downstream portion) 16 having the same size as the corresponding passageway of FIG. 1 and communicating with a massflow controller 1, and a first fluid subpassageway (upstream portion) 24 substantially in alignment with the main passageway 16. The outflow channel 23 is held in communication with an outflow channel 12 in an upper valve body 4 by a bypass channel 15, which has the same size as that of FIG. 1.

Figure 3:
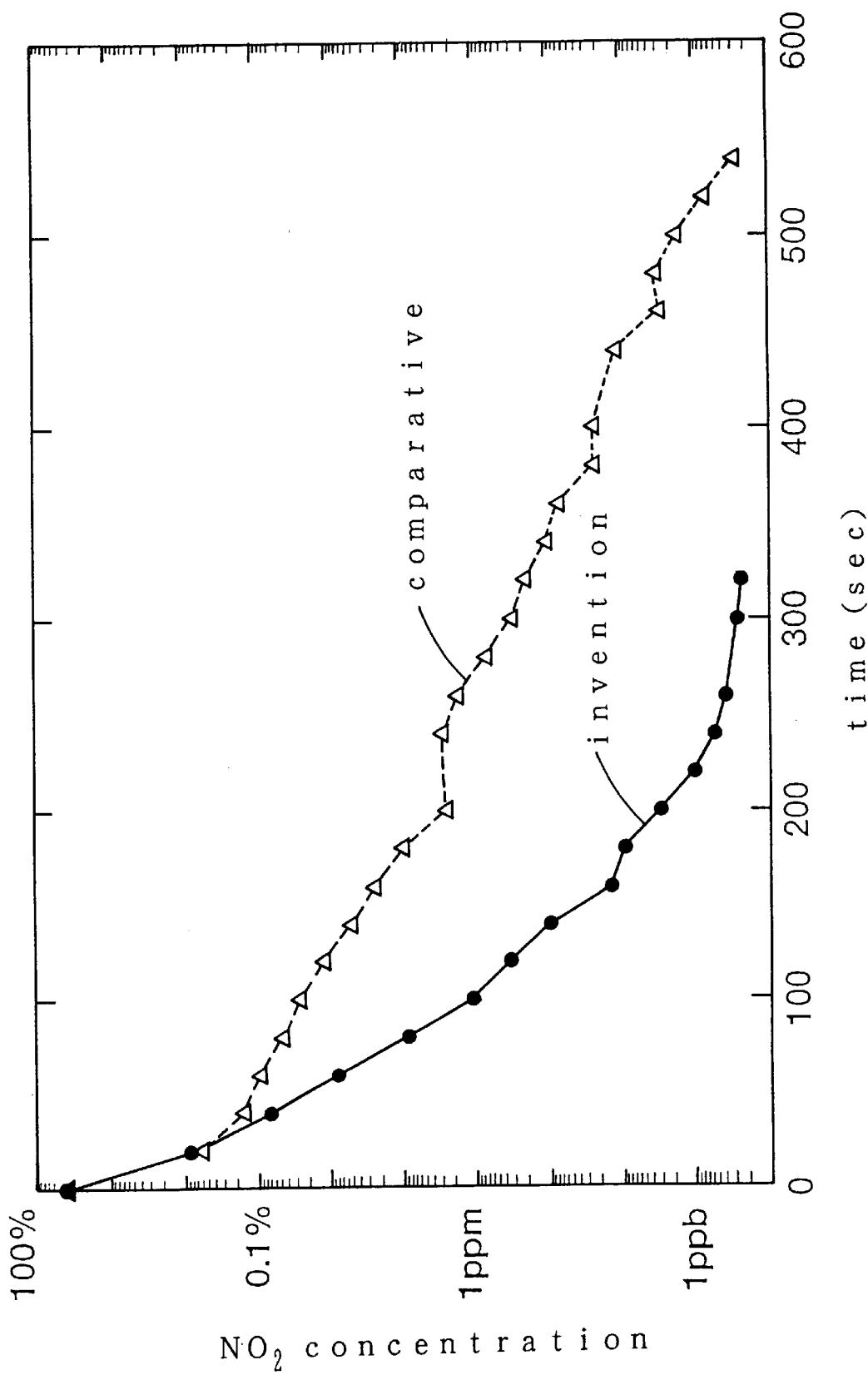
FIG. 3 is a graph showing replacement characteristics of the fluid control devices shown in FIGS. 1 and 2.

FIG. 3 shows variations in the purity of a process gas after the start of passage of the process gas through the fluid control devices shown in FIGS. 1 and 2. The purity of the process gas was measured by checking the concentration of $N_2$ serving as a purge gas. The dead volume was 0.7 cc. FIG. 3 reveals that with the device shown in FIG. 1, the concentration of nitrogen gas decreases to less than 1 ppb upon lapse of 250 seconds, and that with the device shown in FIG. 2, the nitrogen gas concentration is higher than 1 ppm 250 seconds later, failing to decrease to not higher than 1 ppb despite the lapse of 500 seconds.

Although the two devices are the same in the size of the second fluid subpassageway 18 providing a dead volume, the device wherein the subpassageway 18 closed by the actuator 6 and the first fluid subpassageway 17 are generally aligned with each other and communicate with the main passageway 16 nearly at a right angle therewith (see FIG. 1) exhibits higher replacement characteristics than the other device wherein the second fluid subpassageway 18 communicates with the first fluid subpassageway 24 nearly at a right angle therewith (see FIG. 2).

The above result is usable as a criterion in evaluating passages formed not only in fluid control devices of the type shown in FIG. 1 but also in any other fluid control devices.

Figure 4:
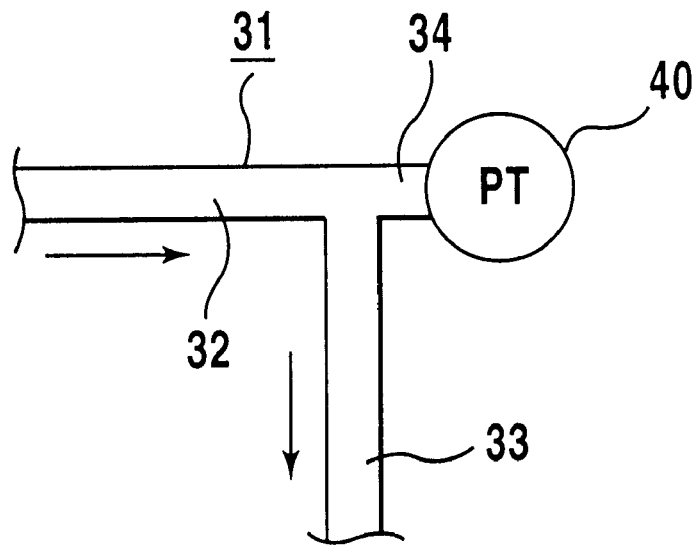
FIG. 4 is a piping diagram showing another embodiment of fluid control device of the invention.
Figure 5:
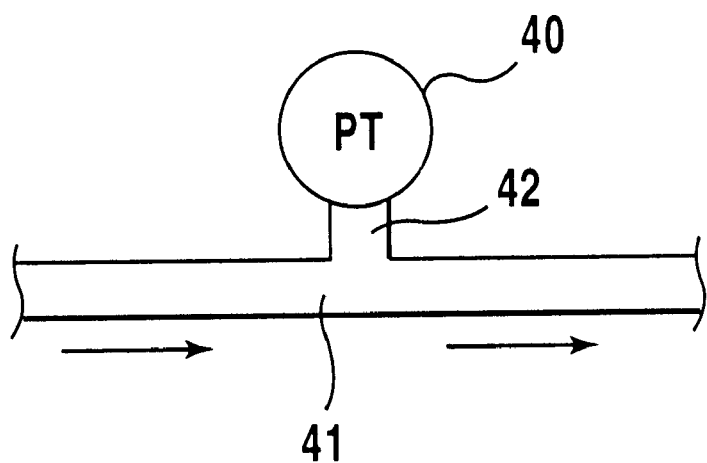
FIG. 5 is a piping diagram showing a prior-art device corresponding to the device shown in FIG. 4.

FIG. 4 shows an optimum passageway for use with a pressure gauge or other measuring instrument. A main passageway 31 comprises an upstream portion 32 and a downstream portion 33 communicating therewith nearly at a right angle therewith. A branch channel 34 having a terminating end closed with a pressure gauge 40 extends from the terminating end of the upstream portion 32 of the main passageway 31 in alignment with this portion 32. This arrangement produces the same effect as is shown in the graph of FIG. 3, when compared with a conventional arrangement shown in FIG. 5, consequently shortening the replacement time although the two arrangements have branch channels 34, 42 of the same volume.

Although the foregoing devices have been described for use with gases, such as a process gas and a purge gas, useful for producing semiconductors, the same advantage as described above can be obtained with devices of similar construction for other uses or for use with liquids instead of gases.

What is claimed is:

1. A fluid control device for selectively passing different fluids alternately to a massflow controller, comprising:

lower and upper on-off valves including a lower valve body and an upper valve body disposed in mutually opposed integral relation, selectively operated actuator attached to each of said valve bodies for controlling fluid flow through the respective on-off valves, said lower valve body containing an inflow channel for conducting a first fluid from an exterior of said fluid control device to the actuator attached to said lower valve body, said upper valve body containing an inflow channel for conducting a second fluid from an exterior of said fluid control device to the actuator attached to said upper valve body, an outflow channel in said upper valve body having one end communicating with said actuator in said upper valve body and its other end penetrating a lower end of said upper valve body and said outflow channel being lineally straight between said actuator and said lower end of said valve body, a by-pass channel portion in said lower valve body having one end penetrating an upper end of said lower valve body and connecting with said other end of said outflow channel in said upper valve body and another end spaced closely adjacent said actuator in said lower valve body, a fluid sub-passageway in said lower valve body communicating at one end with said actuator in said lower valve body and at its other end with the other end of said by-pass channel portion, said fluid sub-passageway and said by-pass channel portion being in axial alignment through said lower valve body, a main passageway from said fluid control device to said massflow controller being disposed in said lower valve body and having one end communicating at the point of connection between said by-pass channel portion and said fluid sub-passageway in said lower valve body, and its other end opening from said lower valve body, said first fluid flowing in through said inflow channel of said lower valve body being fed to said massflow controller via said sub-passageway of said lower valve body and said main passageway of said lower valve body, and said second fluid flowing in through said inflow channel of said upper valve body being fed to said massflow controller via said outflow channel of said upper valve body, said by-pass channel portion of said lower valve body and said main passageway of said lower valve body.

* * * * *